US 6,726,153 B1

(12) United States Patent
Campbell

(10) Patent No.: US 6,726,153 B1
(45) Date of Patent: Apr. 27, 2004

(54) PHOTON MOMENTUM TRANSFER PLANE FOR ASTEROID, METEOROID, AND COMET ORBIT SHAPING

(75) Inventor: Jonathan W. Campbell, Harvest, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/392,482

(22) Filed: Mar. 19, 2003

Related U.S. Application Data

(63) Continuation-in-part of application No. 09/923,260, filed on Aug. 6, 2001, now abandoned.

(51) Int. Cl.⁷ ................................................ B64G 1/64
(52) U.S. Cl. ...................................... 244/161; 244/168
(58) Field of Search ............................ 244/158 R, 161, 244/168, 172, 173, 162

(56) References Cited

U.S. PATENT DOCUMENTS

| | | | |
|---|---|---|---|
| 3,478,986 A | * 11/1969 | Fogarty | 244/159 |
| 4,712,753 A | * 12/1987 | Howard | 244/161 |
| H1383 H | * 12/1994 | Kaplan et al. | 84/483.2 |

OTHER PUBLICATIONS

Solar Sailing, Eric Drexler, http://www.aeiveos.com/~bradbury/Authors/Engineering/Drexler-KE/SS.html.*
High Performance Solar Sails and Related Reflecting Devices, K.E. Drexler, http://www.aeiveos.com/~bradbury/Authors/Engineering/Drexler-KE/HPSSaRRD.html.*

* cited by examiner

Primary Examiner—Peter M. Poon
Assistant Examiner—Timothy D. Collins
(74) Attorney, Agent, or Firm—James J. McGroary; Stephen J. Stark

(57) ABSTRACT

A spacecraft docks with a spinning and/or rotating asteroid, meteoroid, comet, or other space object, utilizing a tether shaped in a loop and utilizing subvehicles appropriately to control loop instabilities. The loop is positioned about a portion of the asteroid and retracted thereby docking the spacecraft to the asteroid, meteoroid, comet, or other space object. A deployable rigidized, photon momentum transfer plane of sufficient thickness may then be inflated and filled with foam. This plane has a reflective surface that assists in generating a larger momentum from impinging photons. This plane may also be moved relative to the spacecraft to alter the forces acting on it, and thus on the asteroid, meteoroid, comet, or other space object to which it is attached. In general, these forces may be utilized, over time, to alter the orbits of asteroids, meteoroids, comets, or other space objects. Sensors and communication equipment may be utilized to allow remote operation of the rigidized, photon momentum transfer plane and tether.

19 Claims, 3 Drawing Sheets

PHOTON MOMENTUM TRANSFER PLANE FOR ASTEROID, METEOROID, AND COMET ORBIT SHAPING

CLAIM OF PRIORITY

This application is a continuation-in-part of U.S. patent application Ser. No. 09/923,260 filed Aug. 6, 2001 now abandoned.

ORIGIN OF THE INVENTION

This invention was made by an employee of the United States Government and may be manufactured and used by or for the Government for governmental purposes without the payment of any royalties thereon or thereof.

BACKGROUND OF THE INVENTION

1. Field of the Invention

This invention relates to an apparatus and method for shaping or managing the orbit of an asteroid, meteoroid, comet, or other space object and includes docking an interceptor spacecraft and/or any associated subvehicles in formation to an asteroid typically undergoing rotation about one or more axes using a tether loop specially designed to minimize loop instabilities, and with the interceptor spacecraft and/or associated subvehicles docked, deploying a rigidized, variable pitch, photon momentum transfer plane to adjust the orbit of the satellite. Photons from the Sun and/or an appropriately positioned laser array may be utilized.

2. Prior Art

The solar system contains many asteroids, meteoroids, and comets, moving in varying orbits around the sun. Some of these orbits intersect the Earth's orbit and hence pose a potential threat. They are referred to as near Earth objects (NEO's). Presently, there have been no known efforts made to adjust the orbits of NEO's to avoid the possibility of one entering the Earth's atmosphere, striking the Earth, and causing serious problems. Even a relatively small NEO (1–10 kilometers) impacting the Earth at hypervelocity may cause massive extinctions and the destruction of human civilization on a large scale. The dinosaurs are now believed to have been extinguished 65 million years ago by a 1–10 kilometer asteroid impacting at hypervelocity on the Yucatan peninsula. In addition to the dinosaurs, fossil records indicate that 70% of all species of life were eradicated as a result of an impact greater than multiple nuclear warheads being detonated. The only comparison we can make to the energy release from a relatively small impacting hypervelocity NEO is the detonation of our largest nuclear warheads. Thousands of NEOs presently share solar system space with the Earth. They pose a clear and present danger to human civilization. Preventing an impact has been coined by the inventor in talks given to the World Space Congress and in other venues as the Impact Imperative.

Photons are known to transfer momentum to an object as they impinge upon its surface. A reflective surface increases the momentum transferred as opposed to an absorbing surface. A need exists to use this momentum to adjust the orbit of asteroids, meteoroids, comets, or other objects in a space environment. While the Impact Imperative associated with NEO's is paramount, secondary objectives may also be realized through orbit shaping for both NEO's and other asteroids, meteoroids, and comets in the solar system including establishing convenient orbits for mining, outposts, observatories, way stations, as sources enabling in situ materials utilization for deep space missions, etc.

Tether technologies are maturing and have been demonstrated in space. However, no effort is believed to have been made to tether an interceptor spacecraft(s) to an asteroid.

Inflatable structure technology is a maturing area. A need exists to deploy a rigidized, photon momentum transfer plane sufficiently thick to insure structural integrity on an asteroid to utilize photon pressure acting on the plane to adjust the orbit of the asteroid.

SUMMARY OF THE INVENTION

Consequently, it is a primary object of the present invention to adjust the orbit around the Sun of an asteroid, meteoroid, comet or other object.

It is a further object of the present invention to deploy a rigidized, photon momentum transfer plane delivered by a spacecraft(s) to adjust the orbit of the asteroid, meteoroid, or comet. This plane will be sufficiently thick to insure structural integrity during all phases of operation and may be of any shape (e.g., circular, elliptical, square). Inflatable technologies (although there may be others) should be a suitable design approach.

Another object of the present invention is to tether a spacecraft along with zero or more associated subvehicles to an asteroid in order to dock the spacecraft and any associated subvehicles with the asteroid.

Accordingly, the present invention provides a spacecraft for docking with an asteroid, meteoroid, or comet. The spacecraft is launched to intercept an asteroid, meteoroid, or comet in space. Near Earth Objects (NEOs) are believed to be the highest priority objects for operations. Onboard thrusters on the spacecraft may be utilized to synchronize the orbits of the spacecraft and the asteroid, meteoroid, or comet. A tether loop is preferably deployed from the spacecraft with the loop having a diameter larger than the asteroid, meteoroid, or comet. For large asteroids, and hence large loops, the spacecraft may deploy a number of subvehicles to avoid loop instabilities as the system maneuvers to engage the asteroid, meteoroid, or comet. With the loop appropriately positioned about the asteroids, meteoroids, comets, or other space object, the tether is retracted until the spacecraft system is firmly docked against the asteroid, meteoroid, or comet.

Once the spacecraft is docked, other anchoring mechanisms may be deployed to further secure the spacecraft and/or subvehicles to the asteroid, meteoroid, or comet. A rigidized, photon momentum transfer plane is then deployed from the spacecraft and/or one or more of the sub-vehicles. The rigidized, photon momentum transfer plane is sufficiently thick to insure structural integrity with one design approach being an inflatable technology that may be filled with foam for additional rigidity. The rigidized, photon momentum transfer plane may be continuously moved relative to the surface of the asteroid, meteoroid, or comet so that photon pressure acting over time against it propels the asteroid, meteoroid, or comet in a desired manner to a safe or convenient new orbit. The source of the photons may either be the Sun or a laser system.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
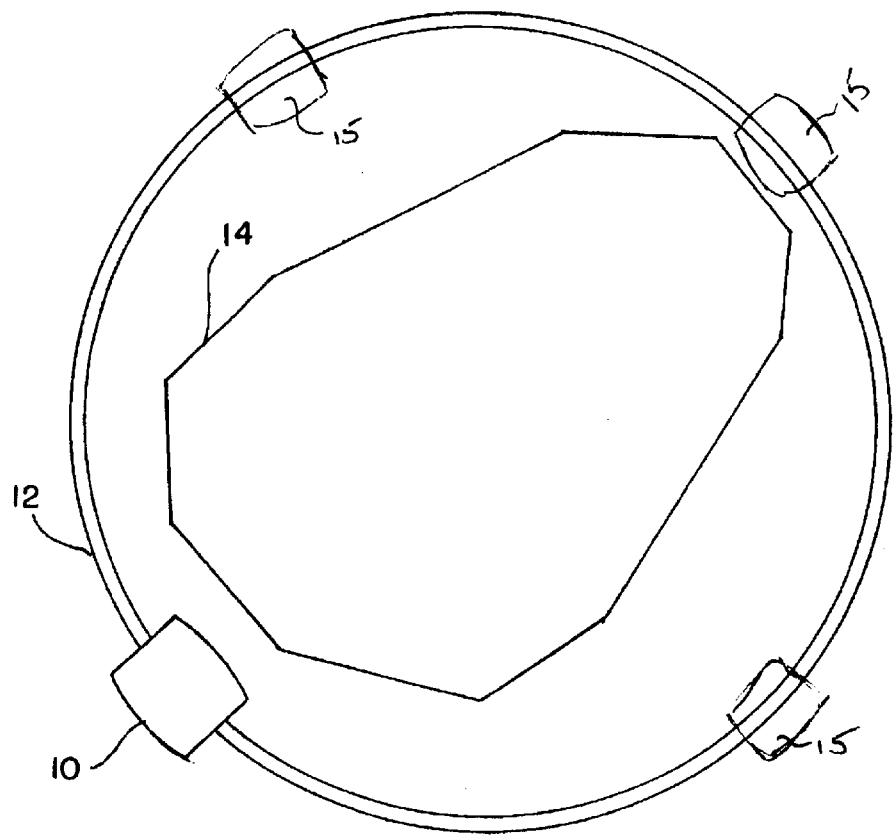
FIG. 1 is a diagramed view of a spacecraft with associated subvehicles and a tether loop deployed about an asteroid, meteoroid, or comet target.

Referring to the FIG. 1, a spacecraft 10 is illustrated along with three deployed subvehicles 15 to prevent loop instabilities deploying a tether 12 about a target or object 14 that could be an asteroid, meteoroid, comet or other space object. The spacecraft 10 may include any acceptable vehicle utilized to travel from one point to another in space. It is anticipated that spacecraft 10 could be deployed from rockets launched from the earth, the space station, other orbiting platforms, or from other spacecraft. Objects 14 may include asteroids, meteoroids, or comets, or other bodies in space that the orbit is desired to be adjusted. Most objects 14 will be tumbling and/or rotating making their capture and control somewhat more difficult with traditional methods. The number of subvehicles may vary depending on the situation. Parameters such as object size and object rotation will be primary factors in determining the number of subvehicles to be used.

Figure 2:
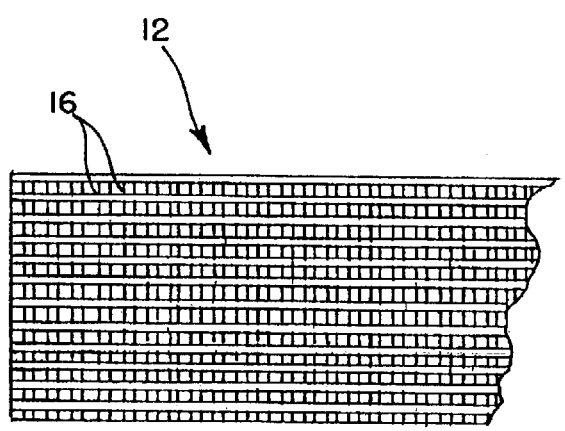
FIG. 2 is a close up view of the tether material of FIG. 1.

The tether 12 forms a loop about the object 14. A detailed view of the tether 12 is illustrated in FIG. 2. The tether 12 may be constructed in a ribbon of fabric such as from an aramid fiber such as Kevlar (TM) or from other suitable materials. The tether 12 may have rigid ribs 16 to assist in the maintaining the loop integrity during deployment. Loop stability during maneuver is a major technical problem that this approach will solve. It is anticipated that the tether 12 will have a width proportional to the size of the loop expected to be deployed and the mass to be docked. This may range from an inch or so in width to several inches. Thickness will be similar affected.

As shown in FIG. 1, when the spacecraft 10 approaches the intended object 14, the tether 12 is deployed to form a loop. Loops could be as large as several kilometers, if necessary. The loop should be greater in circumference than the circumference portion of the object 14 to be retained. The spacecraft 10 would then maneuver to position the loop about the object 14.

Subvehicles 15 are useful to maintain the loop sufficiently shaped to be positioned about the asteroids, meteoroids, comets, and other space objects illustrated as object 14. Although shown equi-spaced, the subvehicles 15 about the object 14, this may not be desirable in all embodiments. Each subvehicle 15 preferably has its own independent onboard propulsion, sensors, and guidance system so that it can fly in any formation desired. The spacecraft 10 may be designated the primary controller. With the spacecraft 10 and subvehicles 15 deployed as shown in FIG. 1, the loop may be expanded to an appropriate size and shape. Although the loop is illustrated as elliptical in FIG. 1, it may be somewhat square or take the form of other geometric representations in space to conform optimally to the specific asteroid, meteoroid, or comet in question.

Onboard sensors on the spacecraft 10 and/or subvehicles 15 could be utilized to evaluate the position of the loop relative to the object 14. When desired alignment is achieved, the space craft 10 and/or subvehicles 15 may begin to retract the tether 12 to tighten the loop about the object 14, such as be winding the tether 12 on a reel and/or utilizing the subvehicle propulsion guidance systems. As the loop is retracted, the spacecraft 10 and the subvehicles 15 are docked to the object 14.

Once the spacecraft 10 and subvehicles 15 are sufficiently close, preferably contacting the object 14, additional anchors may be employed to secure the spacecraft 10 and/or the subvehicles 15 to the object 14. Additional anchors may include explosive driven, screw driven, or other appropriate anchors.

Figure 3:
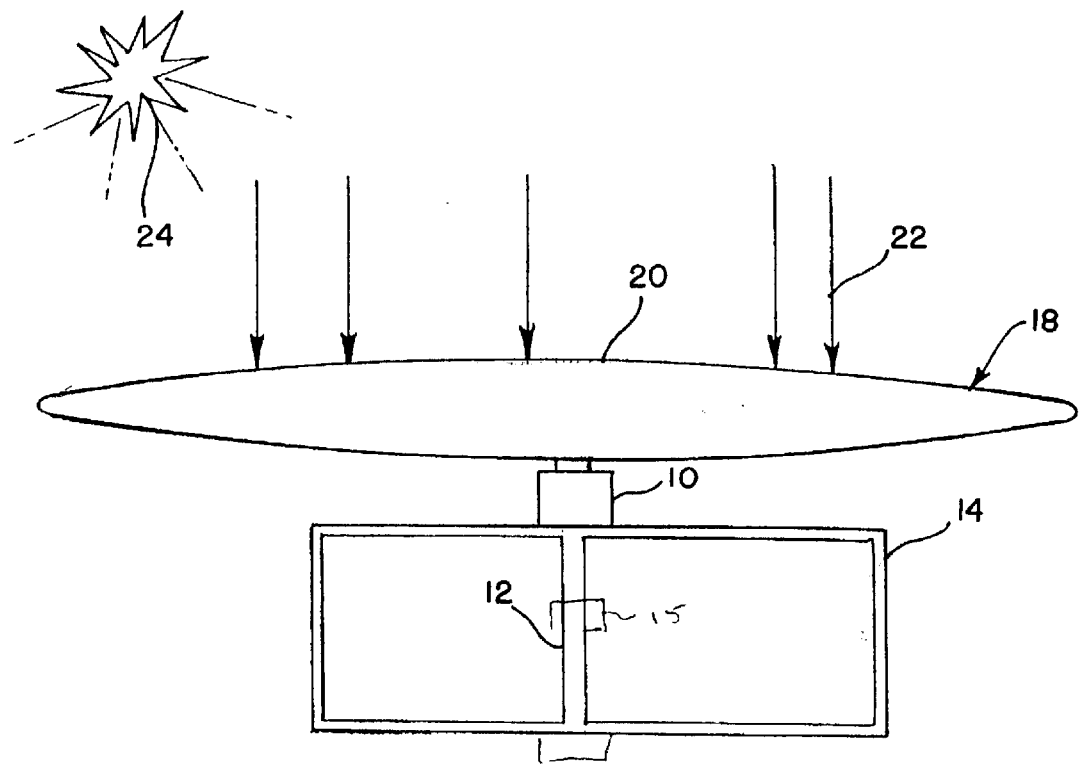
FIG. 3 is a diagramed view of the spacecraft secured to a asteroid, meteoroid, or comet with a rigidized, photon momentum transfer plane deployed in a first position.
Figure 4:
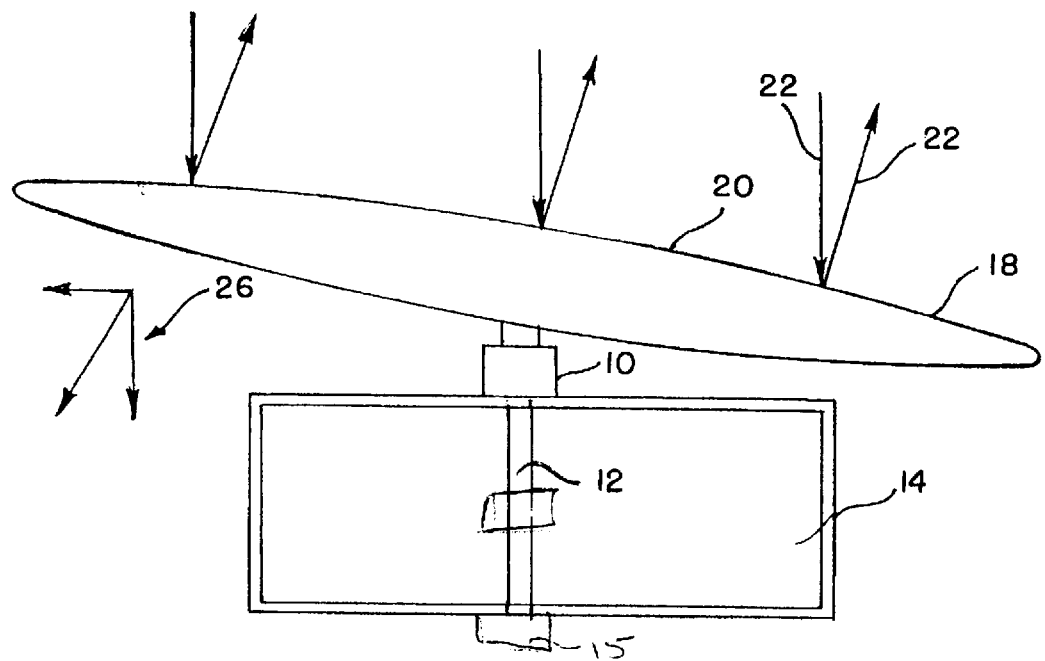
FIG. 4 is a diagramed view of the spacecraft with the rigidized, photon momentum transfer plane deployed to a second position.

With the spacecraft 10 and subvehicles 15 connected to the object 14 a rigidized, photon momentum transfer plane may now be deployed and positioned as illustrated in FIGS. 3 and 4 from the spacecraft 10 and/or one or more of the subvehicles 15. The rigidized, photon momentum transfer plane 18 may be then inflated to the deployed position. During the inflation process and/or once inflated, the rigidized, photon momentum transfer plane 18 may be filled with foam or other appropriate material for additional rigidity. The exposed surface 20 of the rigidized, photon momentum transfer plane 18 may be silvered or otherwise made to be reflective such as by applying a thin film to the surface 20. A suitable rigidized, photon momentum transfer plane 18 may be constructed from kapton (TM) or other suitable material that is sufficiently light weight, but can be utilized to have a relatively large surface area.

With the rigidized, photon momentum transfer plane 18 deployed, the object 14 may now be maneuvered. Specifically, the rigidized, photon momentum transfer plane 18 is struck by photons 22 from a source 24 such as the Sun or an appropriately positioned laser array. The photons 22 transfer momentum to the rigidized, photon momentum transfer plane 18. In FIG. 3, the photons 22 strike the rigidized, photon momentum transfer plane 18 to move the object 14 in the direction of the photon movement.

In FIG. 4, the rigidized, photon momentum transfer plane 18 is angled. A rigidized, photon momentum transfer plane movement mechanism in the spacecraft 10 or subvehicle 15 is utilized to move the rigidized, photon momentum transfer plane 18 to varying appropriate positions as shown in the example labeled FIG. 4. An exaggerated thrust diagram 26 is shown in FIG. 4 showing that the asteroid, meteoroid, or comet 14 would move downwardly as well as to the left over time due to the rigidized, photon momentum transfer plane 18 position. Sensors and transmitters/receivers may be utilized to provide information to and from a station on Earth, or elsewhere, for the coordination of docking; rigidized, photon momentum transfer plane 18 deployment; as well as rigidized, photon momentum transfer plane 18 movement to direct the object 14 to a desired orbit. Ground control, or another appropriate controller, may move the rigidized, photon momentum transfer plane 18 to a desired position. Solar panels may be provided with the spacecraft 10 to provide electrical power to the sensors and communication subsystems of the spacecraft/subvehicles 10 and 15.

The forces of the impinging photons 22 may be calculated using Newton's Second Law, $F=dp/dt$, where P is the momentum and $dp/dt$ is the change in momentum with respect to time. The change in momentum is the momentum transferred to the rigidized, photon momentum transfer plane by impinging photons during a given time interval. Maxwell showed that momentum delivered to an object through radiation is equal to the electromagnetic radiation divided by the speed of light, $p=U/c$. When the photon is totally reflected by the object, then the momentum imparted is doubled, $p=2U/c$. This phenomenon has been documented in carefully controlled experiments by the inventor and others, as well as observed in nature (i.e., the tail of a comet always points away from the Sun due to radiation pressure).

The inventor has performed extensive simulations and laboratory experiments to substantiate his claims. For example, solar pressure from the Sun at the Earth is approximately equal to $1.00 \times 10^{-5}$ N/m$^2$. A rigidized, photon momentum transfer plane 18 that is 1 km in diameter would have a radius of 500 meters and its area would be $7.85 \times 10^5$ m$^2$ (i.e., area=pi×r$^2$). A subject asteroid having a density of 10 kg/m$^3$ and a radius of 500 meters would have a volume of $5.24 \times 10^8$ cubic meters (volume=4/3×Pi×radius$^3$). With the rigidized, photon momentum plane docked, deployed and fully operational, the object would experience an acceleration of $1.5 \times 10^{-9}$ m/s$^2$ (m/s$^2$)=(P×A)/(rho×V) due to the photon 18 transfer of momentum.

Accordingly for an acceleration period of 1 year ($3.15 \times 10^7$ seconds), the asteroid would be deflected $7.46 \times 10^5$ meters; for 2 years, $2.98 \times 10^6$ meters; for 3 years, $6.71 \times 10^6$ meters; and 10 years, $7.46 \times 10^7$ meters. Therefore, in just three years, an asteroid that originally was going to strike the dead center of the Earth's disk would be deflected enough to completely miss the Earth.

Figure 5:
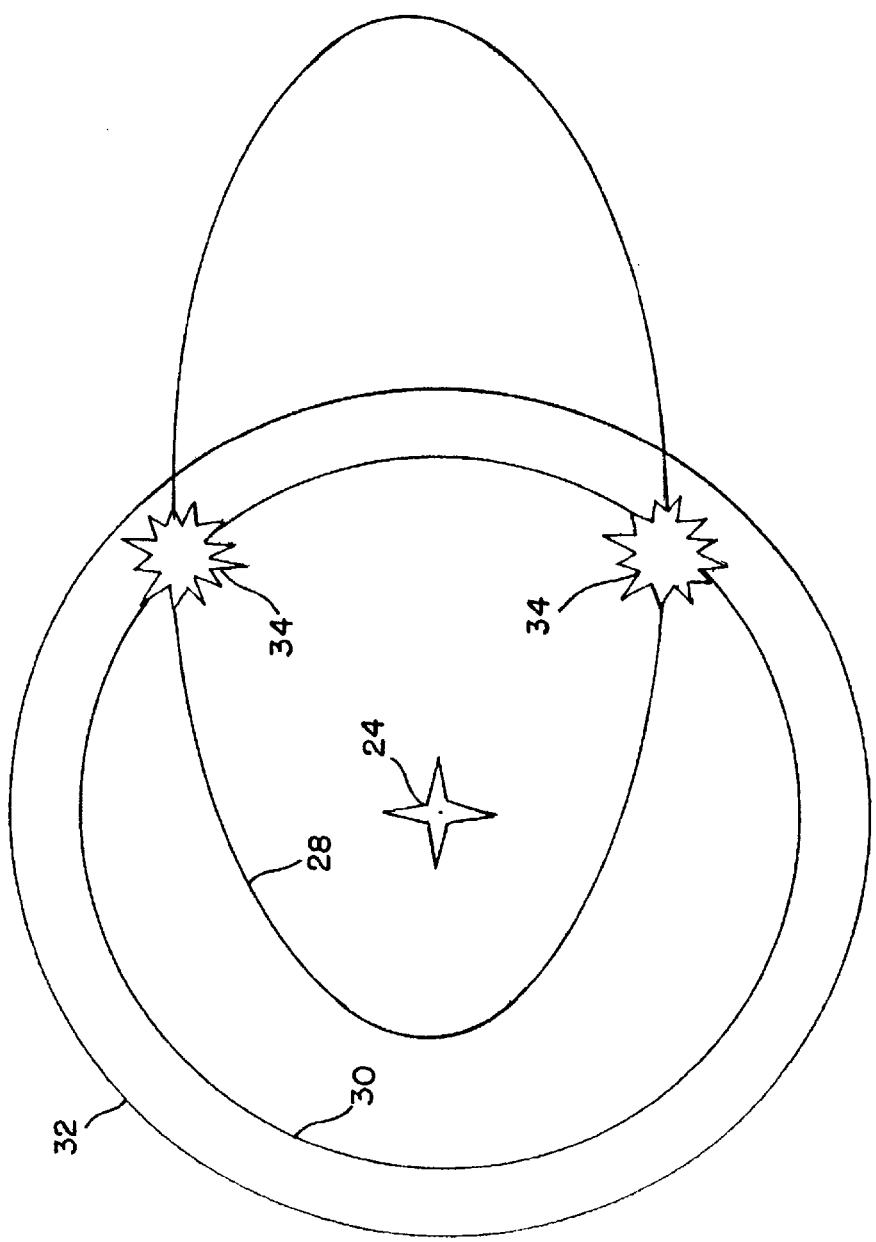
FIG. 5 is a diagramed view of the orbit of the Earth about the Sun with two orbits of an asteroid, meteoroid, or comet about the Sun.

FIG. 5 shows a first orbit 28 of an asteroid about the sun 24. The first orbit 28 of the asteroid intersects the earth's orbit 30 at collision points 34. If the earth and the asteroid were to be at the collision points 34 at the same time, severe consequences would occur. However, by utilizing the spacecraft 10 and any associated subvehicles 15 with the rigidized, photon momentum transfer plane 18 of FIGS. 1, 3 and 4 that may be docked with tether 12, the first orbit 28 of the asteroid may be altered to second orbit 32 to avoid any possibility of future problems with the earth's orbit 30 about the Sun 24 conflicting with the asteroid orbit about the sun 24. The orbit may be then further adjusted to make the asteroid available for mining, in situ materials utilization, etc.

Numerous alternations of the structure herein disclosed will suggest themselves to those skilled in the art. However, it is to be understood that the present disclosure relates to the preferred embodiment of the invention that is for purposes of illustration only and not to be construed as a limitation of the invention. All such modifications that do not depart from the spirit of the invention are intended to be included within the scope of the appended claims.

Having thus set forth the nature of the invention, what is claimed herein is:

1. A spacecraft capable of docking with an asteroid, meteoroid, comet or other space object, said spacecraft comprising:
    a tether, said tether deployable from the spacecraft to form a loop of a first circumference in a space environment;
    sub-vehicles connected to the tether, said sub-vehicles independently maneuverable and utilized to position at least a portion of the loop of the tether in the space environment;
    wherein retraction of said tether relative to the spacecraft and subvehicles forms the loop into a second circumference, said first circumference greater than said second circumference, and said tether docks the spacecraft and subvehicles to the one of the asteroid, meteoroid, comet or other space object.

2. The spacecraft of claim 1 wherein said second circumference approximately equivalent to an outer circumference of a portion of one of the asteroid, meteoroid, comet or other space object.

3. The spacecraft of claim 1 further comprising thrusters connected to the subvehicles and configured to maneuver the subvehicles in the space environment to assist in positioning the loop of the tether about a portion of one of the asteroid, meteoroid, comet or other space object.

4. The spacecraft of claim 1 further comprising sensors for evaluating the position of the tether in space.

5. The spacecraft of claim 4 further comprising communications equipment to report and receive information related to the docking process.

6. The spacecraft of claim 1 further comprising an anchor for securing the spacecraft to the asteroid, meteoroid, comet, or other object after capturing the one of the asteroid, meteoroid, comet, or other space object with the tether.

7. The spacecraft of claim 6 wherein the anchor is screw driven.

8. The spacecraft of claim 6 further comprising a plurality of subvehicles spaced apart about the loop, each of the plurality of subvehicles independently maneuverable.

9. The spacecraft of claim 1 wherein the tether is comprised of a ribbon having ribs.

10. The spacecraft of claim 1 further comprising a deployable rigidized, photon momentum transfer plane deployable from the spacecraft after docking with the one of the asteroid, meteoroid, comet, or other space object, said rigidized, photon momentum transfer plane characterized by a rigid structure maneuverable relative to the one of the asteroid, meteoroid, comet or other space object and capable of altering the orbit of the one of the asteroid, meteoroid, comet, or other space object when deployed.

11. The spacecraft of claim 1 wherein the spacecraft is an Earth launched satellite.

12. A spacecraft for adjusting the orbit of an object comprising one of an asteroid, meteoroid, comet or other space object, said spacecraft comprising:
    a deployable rigidized, photon momentum transfer plane connected to and moveable relative to the spacecraft when deployed in a space environment;
    an object comprising one of an asteroid, meteoroid, comet or other space object;
    a tether about the object connected to the space craft with sub-vehicles connected to the tether, said sub-vehicles independently maneuverable and utilized to position at least a portion of the loop of the tether in the space environment; and
    an anchor securing the spacecraft to the object;
    wherein said rigidized, photon momentum transfer plane is deployed after securing the spacecraft to the object, said rigidized, photon momentum transfer plane having a reflective surface that is moveable allowing the pitch of the plane to be varied relative to the object to assist in altering the orbit of the object, said rigidized, photon momentum transfer plane receiving a force from photon energy thereby altering the orbit of the object.

13. The spacecraft of claim 12 further comprising communication equipment on the spacecraft for transferring commands to the spacecraft from a remote location to move the rigidized, photon momentum transfer plane relative to the spacecraft to adjust the orbit of the asteroid, meteoroid, comet, or other object.

14. The spacecraft of claim 12 in combination with a photon source from the group of a laser appropriately positioned in space and the sun, said photon source directing photons on the rigidized, photon momentum transfer plane, thereby altering the orbit of the object.

15. The spacecraft of claim 12 wherein the rigidized, photon momentum transfer plane is an inflatable solar rigidized, photon momentum transfer plane filled with foam.

16. The spacecraft of claim 12 wherein the tether is deployable from the spacecraft to form a loop of a first circumference in a space environment;

said tether then retractable relative to the spacecraft so that said loop forms a second circumference, said first circumference greater than said second circumference, wherein retraction of the tether docks the spacecraft to the object.

17. A method of changing the orbit of an object comprising:
   a. locating a spacecraft in the vicinity of one of an object selected from the group of an asteroid, meteoroid, comet or other space object in a space environment;
   b. deploying a tether from the spacecraft to form a loop of a first circumference, said first circumference greater than a circumference of a portion of the object;
   c. positioning the loop about the portion of the object with at least one independently maneuverable subvehicle and the spacecraft to locate the loop about the object;
   d. retracting the tether to dock the spacecraft and at least one subvehicle to the object; and
   e. then deploying a rigidized, variable pitch photon momentum transfer plane from the spacecraft to deflect the orbit of the object, said rigidized, photon momentum transfer plane formed into a rigid structure after deploying from the spacecraft.

18. The method of claim 17 wherein the step of providing a rigidized, photon momentum transfer plane further comprises deploying an inflatable rigidized, photon momentum transfer plane from the space craft with a reflective surface, filling the rigidized, photon momentum transfer plane with a foam, and allowing said rigidized, photon momentum transfer plane to be acted upon by photon energy to alter the orbit of the object over time.

19. The method of claim 17 further comprising utilizing sub-vehicles to assist in positioning the loop about the portion of the object.

* * * * *